US011405806B2

(12) United States Patent
Takla et al.

(10) Patent No.: US 11,405,806 B2
(45) Date of Patent: Aug. 2, 2022

(54) SYSTEMS AND METHODS FOR PERFORMING A DIAGNOSTIC ANALYSIS OF A WIRELESS TELECOMMUNICATION NETWORK

(71) Applicant: Verizon Patent and Licensing Inc., Basking Ridge, NJ (US)

(72) Inventors: Mourad B. Takla, Hillsborough, NJ (US); Chin Chiu, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 64 days.

(21) Appl. No.: 16/998,645

(22) Filed: Aug. 20, 2020

(65) Prior Publication Data
US 2022/0060915 A1    Feb. 24, 2022

(51) Int. Cl.
*H04W 24/06* (2009.01)
*H04W 76/45* (2018.01)
*H04L 41/14* (2022.01)
*H04W 72/04* (2009.01)
*H04W 88/06* (2009.01)

(52) U.S. Cl.
CPC .......... *H04W 24/06* (2013.01); *H04L 41/145* (2013.01); *H04W 72/042* (2013.01); *H04W 72/0413* (2013.01); *H04W 76/45* (2018.02); *H04W 88/06* (2013.01)

(58) Field of Classification Search
CPC ............ H04W 24/06; H04W 72/0413; H04W 72/042; H04W 76/45; H04W 88/06; H04L 41/145
See application file for complete search history.

(56) References Cited

U.S. PATENT DOCUMENTS

| | | | |
|---|---|---|---|
| 2007/0019769 A1* | 1/2007 | Green ................ | H04B 17/27 375/360 |
| 2013/0286860 A1* | 10/2013 | Dorenbosch ......... | H04W 24/06 370/252 |
| 2017/0324617 A1* | 11/2017 | Prasad ................ | H04W 24/06 |
| 2020/0195539 A1* | 6/2020 | Sivaraj ................ | H04L 41/145 |

* cited by examiner

*Primary Examiner* — Kiet Tang

(57) ABSTRACT

A system for simulating a wireless communication network over a wired network may comprise a plurality of physical UEs, one or more RANs, and a channel condition emulator. The plurality of UEs may be coupled to one another through the wired network. The one or more RANs may be simulated in software to simulate data transmissions between the plurality of UEs. The channel condition emulator may be simulated in software to derive channel conditions for each of the plurality of UEs based on their current location. The channel condition emulator may further provide the channel conditions to the plurality of UEs and the one or more RANs.

19 Claims, 10 Drawing Sheets

100 ⟶

Network Analysis System
102

150
Perform one or more actions based on running the simulation ⟶

Provide simulation results

Cause a modification to the network to adjust channel conditions

Generate and send a notification to a service representative to service one or more of the base stations of the network Cause an autonomous vehicle to be dispatched to address an issue with the network

SYSTEMS AND METHODS FOR PERFORMING A DIAGNOSTIC ANALYSIS OF A WIRELESS TELECOMMUNICATION NETWORK

BACKGROUND

A wireless telecommunication network may provide various telecommunication services such as telephony, video, data, messaging, and broadcasts. The wireless telecommunication network may include a number of base stations (e.g., a Node B, a gNB, an access point (AP), a radio head, a transmit receive point (TRP), a New Radio (NR) BS, a 5G Node B, and/or the like) that can support communication for a number of user equipment (UEs). A user equipment (UE) may communicate with a base station via a downlink and an uplink. The downlink (or forward link) refers to the communication link from the base station to the UE, and the uplink (or reverse link) refers to the communication link from the UE to the base station.

DETAILED DESCRIPTION OF PREFERRED EMBODIMENTS

Figure 1A:
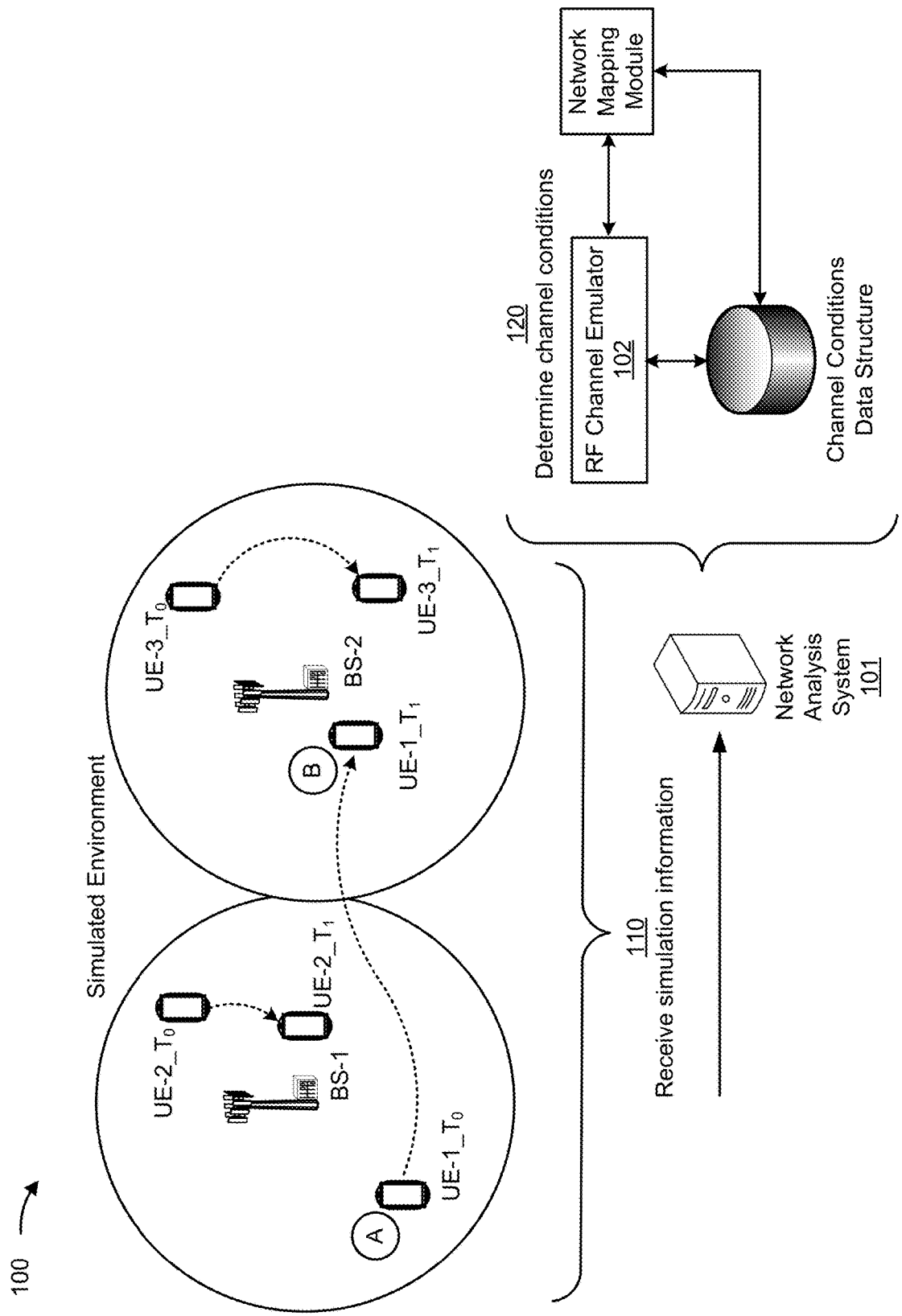
FIGS. 1A-1D are diagrams of one or more example implementations described herein.

The following detailed description of example implementations refers to the accompanying drawings. The same reference numbers in different drawings may identify the same or similar elements.

In some instances, an operator may determine to modify a wireless telecommunication network. For example, an operator may determine that a new base station is to be installed to enable the wireless telecommunication network to accommodate additional user equipment (UE), that the wireless telecommunication network is to be reconfigured to increase a quality of service associated with the wireless telecommunication network, that a site within the wireless telecommunication is to be decommissioned, and/or the like.

Prior to modifying the wireless telecommunication network, the operator may run a simulation to determine the effect of the modification on the wireless telecommunication network. For example, the operator may run a simulation to determine an increase in a quantity of UEs that can be accommodated by the wireless telecommunication network that may result from installing the new base station, whether a change to the configuration of the wireless telecommunication network will improve the quality of service associated with the wireless telecommunication network, and/or the like.

To run the simulation, the user may utilize individual hardware components to simulate the devices (e.g., the UEs, the base stations, and/or the like) included in the wireless telecommunications network. The hardware components may communicate via wireless communication. To prevent unwanted signals from interfering with the simulation, the hardware components may be placed in a dedicated, shielded room. The use of a dedicated, shielded room may increase a complexity and/or a cost with running the simulation. Further, the number of components that can be included in the simulation may be limited by a size of the room.

Alternatively, the user may utilize a software-based system to perform the simulation. The software-based system may utilize software components to simulate the devices included in the wireless telecommunications network. The use of the software components may eliminate the need to perform the simulation in a dedicated, shielded room. However, the software system may be limited to simulations including a single UE and a single base station. Further, the time required to execute the simulation may be greatly increased relative to utilizing individual hardware components to simulate the devices.

Some implementations described herein enable a network analysis system to simulate a performance of a wireless telecommunications network. For example, the network analysis system may obtain simulation data indicating various characteristics of the wireless telecommunications network and may utilize a combination of hardware and software to generate a simulated environment corresponding to the wireless telecommunications network based on the simulation data. The simulated environment may include a plurality of virtual base stations and virtual UEs instantiated on physical devices connected via an Ethernet network. Utilizing the virtual base stations and virtual UEs may enable the wireless telecommunications network to generate a simulated environment that includes tens, hundreds, thousands, or more base stations and/or UEs utilizing fewer physical resources relative to other systems.

A physical layer of the devices may be utilized to transmit data between a UE and a base station via the Ethernet network. When the data is transmitted, the network analysis system may determine a location of the UE based on the simulation data. The network analysis system may obtain channel condition information associated with the location of the UE from a data structure storing channel condition information for a plurality of locations within a geographical area associated with the wireless telecommunications network. The channel condition information for a location may include information indicating RF characteristics associated with a signal transmitted between the UE and the base station while the UE is located at the location.

The channel condition information may be determined and stored in the data structure prior to the network analysis system simulating the performance of the wireless telecommunications network. For example, the network analysis system may obtain actual channel condition information associated with locations within a coverage area of the wireless telecommunications network, the network analysis system may utilize machine learning to determine the channel condition information, and/or the like. In this way, the network analysis system may conserve time and computing resources (e.g., processing resources, memory resources, communication resources, and/or the like) that otherwise would have been utilized to determine the channel condition information during the simulation. The conservation of time and computing resources may enable the network analysis system to simulate a performance of a larger wireless telecommunications network (e.g., a greater quantity of base stations, a greater quantity of UEs operating within the wireless communications network, and/or the like) relative to a system that determines the channel condition information during the simulation of the wireless telecommunications network.

Further, by utilizing channel information stored in the data structure, the network analysis system may reduce an amount of computations performed to determine channel conditions associated with the simulation relative to systems that calculate channel condition information for each data transmission. A reduction in the amount of computations performed to determine the channel conditions may conserve computing resources (e.g., processing resources, memory resources, communication resources, and/or the like) that would have otherwise been used by prior systems that perform a greater amount of computations.

The network analysis system may apply channel conditions to the data and may insert the channel condition information into the transmitted data. By inserting channel conditions into traffic between the UE and the base station, the network analysis system may be more flexible and/or may more accurately reflect real life scenarios relative to other systems for simulating wireless communications. Further, by applying the channel conditions to the data, the network analysis system may simulate the transmission of the data via a wireless telecommunications network without requiring a dedicated, shielded room.

Embodiments described herein also include a method that comprises receiving, at a radio access network data downlink component, data broadcast to a plurality of user equipment, intended for a particular user equipment (UE), extracting, from the data, a portion targeted for the particular UE, encapsulating the portion into a unicast packet including destination radio access network addressing information, transmitting, via a physical interface, the unicast packet to the UE using wired addressing information of the UE. The physical interface may be a wired interface, for example an Ethernet interface. In some aspects a time stamp with a frame and slot number may be applied to the portion of the data, prior to encapsulating the portion into the unicast packet.

In yet other embodiments, a method is described that receives, at a channel condition emulator or a UE side emulator, simulated location information of each of a plurality of physical user equipment (UEs). For each slot in a time domain, a list of the plurality of UEs are generated whose location information has changed. The channel conditions for a predetermined number of radio access networks affecting a location indicated in the location information are obtained, for example from a database or other reference storage location. These channel conditions are then published (e.g., in a topic of a Queue) for each of the plurality of UEs. For example, there may be a topic associated with each UE, allowing a UE to subscribe to their associated topic and obtain channel conditions. In some instances, the channel conditions comprise RF conditions at the location, the RF conditions comprising uplink RF conditions, downlink RF conditions and impairments to the signal transmission. The channel conditions may be stored in a lookup table that corresponds one or more locations to particular channel conditions.

Embodiments described herein also include a method, comprising, receiving, by a device, simulation information associated with simulating a wireless communication session that is associated with a user equipment and a base station of a network, identifying, by the device and from the simulation information, a path of travel of the user equipment relative to a location of the base station during the wireless communication session, determining, by the device and based on the path of travel and the location of the base station, radio frequency (RF) channel conditions associated with the user equipment during the wireless communication session, configuring, by the device and based on the RF channel conditions, a user equipment emulator and a base station emulator to simulate the RF channel conditions of the user equipment, configuring, by the device, a user equipment controller and a base station controller to communicate simulated traffic associated with simulating the wireless communication session, wherein the user equipment controller is associated with the user equipment emulator and the base station controller is associated with the base station emulator, using, by the device, the user equipment controller, the base station controller, the user equipment emulator, and the base station emulator to execute a simulation of the wireless communication session according to the RF channel conditions and providing, by the device, results of executing the simulation in association with an analysis of the network. Further aspects of the method comprise wherein the simulation information includes another path of travel for another user equipment, wherein the RF channel conditions associated with the user equipment are determined based on the other path of travel of the other user equipment.

Further aspects of the method comprise wherein the base station is a first base station and the path of travel indicates that the first base station, during the wireless communication session, is to hand off the user equipment to a second base station, wherein the RF channel conditions are determined based on a location of the second base station.

Further aspects of the method comprise wherein the user equipment emulator comprises a first component of a physical layer of the device and the base station emulator comprises a second component of the physical layer of the device, and wherein the user equipment controller and the base station controller are associated with a media access control layer of the device.

Further aspects of the method comprise wherein the user equipment emulator and the base station emulator are communicatively coupled by a switch module that is configured to handle communications of the wireless communication session. Further aspects of the method comprise wherein the switch module comprises: a high speed switch component associated with communicating the simulated traffic, and a low speed switch component associated with radio frequency simulation of the RF channel conditions. Further aspects of the method comprise: determining, based on executing the simulation, that a performance characteristic of the wireless communication session does not satisfy a threshold; and causing, based on determining that the performance characteristic does not satisfy the threshold, a modification to at least one of the base station or the network to improve the RF channel conditions.

FIGS. 1A-1D are diagrams of one or more example implementations 100 described herein. As shown in FIGS. 1A-1D, a network analysis system 101 is utilized to generate and/or run a simulation of a wireless telecommunications network. The network analysis system 101 may utilize a result of the simulation to perform a diagnostic analysis on the wireless telecommunications network.

As shown in FIG. 1A, and by reference number 110, the network analysis system 101 receives simulation information. The simulation information may include information for generating a simulated environment corresponding to a physical wireless telecommunications network and/or information for executing or running a simulation of the wireless telecommunications network.

In some implementations, the simulation information includes control information, network information, base station information, UE information, and/or the like. The control information may include information associated with generating and/or running the simulation. For example, the control information may include information indicating a length of the simulation (e.g., 1 hour, 1 day, 1 week, and/or the like), information indicating a weather condition associated with the simulation (e.g., sunny, rainy, overcast, and/or the like), and/or the like.

The network information may include information indicating one or more characteristics of the wireless telecommunications network. For example, the network information may include information indicating a frequency band associated with the wireless telecommunications network (e.g., a millimeter frequency band, a 5 GHz frequency band, and/or the like), information indicating a geographical area associated with the wireless telecommunications network (e.g., a coverage area associated with the wireless telecommunications network), information indicating key performance indicators associated with the wireless telecommunications network, and/or the like.

The base station information may include information associated with one or more base stations included in the wireless telecommunications network. For example, the base station information may include information identifying a quantity of base stations included in the wireless telecommunications network, information indicating a geographical location (e.g., a latitude, a longitude, and/or the like) of a base station, information indicating a frequency band associated with a base station, information indicating a configuration of a base station, information indicating a capacity of a base station, and/or the like.

The UE information may include information associated with one or more UEs operating within the wireless telecommunications network. For example, the UE information may include UE location information, UE transmission information, UE characteristic information, and/or the like.

The UE location information may include information indicating a location of a UE and/or a path of travel of the UE during the simulation. For example, the UE location information may include information indicating a geographical location at which the UE is located, information indicating a time at which the UE is located at the geographical location, information indicating a route the UE is to travel along, information indicating a direction of travel associated with the UE, information indicating a speed associated with the UE (e.g., a speed at which the UE is traveling along the path of travel), and/or the like.

The UE transmission information may include information associated with traffic transmitted to, or received by, the UE. For example, the UE transmission information may include information indicating a time and/or a location at which the traffic is transmitted to, or received by, the UE, information indicating a type of traffic (e.g., a request to establish a wireless communication session, a reference signal, an acknowledgement, and/or the like) being transmitted or received, and/or the like.

The UE characteristic information may include information identifying one or more characteristics of the UE. For example, the UE characteristic information may include information indicating an identifier associated with the UE, information indicating a type of the UE (e.g., a smart phone, a laptop, an autonomous vehicle, and/or the like), information indicating a frequency band associated with the UE, information indicating a number of antennas associated with the UE, information indicating a transmission power associated with the UE, and/or the like.

In some implementations, the simulation information is received from another device such as a device included in the wireless telecommunications network, a device storing historical data associated with the wireless telecommunications network, and/or the like. For example, the network analysis system 101 may receive the simulation information from a base station and/or a UE included in the wireless telecommunications network. The base station and/or the UE may provide the simulation information to the network analysis system 101 periodically, based on receiving a request from the network analysis system 101, based on establishing a connection with the wireless telecommunications network, and/or the like. The network analysis system 101 may receive the simulation information and may store the simulation information in a data structure (e.g., a database, a table, a list, and/or the like).

In some implementations, the simulation information is input by a user. A user may desire to run a simulation of the wireless telecommunications network. The user may input the simulation information via a user interface provided by a client device associated with the network analysis system 101. The network analysis system 101 may receive the simulation information input by the user and may store the simulation information in the data structure.

As shown by reference number 120, the network analysis system 101 (e.g., an RF channel emulator 102, as shown in FIG. 1A) determines channel conditions associated with the simulation. The RF channel emulator 102 (alternatively referred to as channel condition emulator) may be a module of the network analysis system 101 that inserts the channel conditions into the uplink channel and/or the downlink channel during the simulation, as described below.

The channel conditions may include information indicating RF characteristics of data being transmitted between a UE and a base station. The channel conditions may include information corresponding to information transmitted between a base station and a UE to enable the base station and the UE to determine channel conditions associated with transmitting data between the base station and the UE. For example, the channel conditions may include information indicating a quality and/or a strength of a signal transmitted via an uplink channel (e.g., from a UE to a base station) and/or information indicating a quality and/or a strength of a signal transmitted via a downlink channel (e.g., from a base station to a UE) such as information indicating a reference signal received power (RSRP), information indicating a reference signal received quality (RSRQ), information indicating a signal to interference plus noise ratio (SINR), information indicating a received signal strength indicator (RSSI), and/or the like.

The network analysis system 101 (e.g., a network mapping module, as shown in FIG. 1A) may determine a plurality of locations included within a geographical area associated with the wireless telecommunications network. The plurality of locations may correspond to locations of UEs as the UEs travel through the wireless telecommunications network. The network analysis system 101 may utilize the plurality of locations to determine the channel conditions associated with the UEs, as described in greater detail below.

In some implementations, the network analysis system 101 determines the plurality of locations based on information input by a user. The user may input information identifying the plurality of locations and/or information for determining the plurality of locations (e.g., a quantity of the plurality of locations, a distance separating adjacent locations (e.g., 1 meter, 3 meters, 10 meters, and/or the like), and/or the like).

In some implementations, the simulation information includes information identifying the plurality of locations and/or information for determining the plurality of locations. The network analysis system 101 may determine the plurality of locations based on the simulation information.

The network analysis system 101 may determine channel conditions associated with the plurality of locations. The network analysis system 101 may determine an uplink channel condition and a downlink channel condition associated with data being transmitted between a UE, located at a particular location, and one or more base stations associated with a coverage area that includes the particular location. The network analysis system 101 may determine the uplink channel condition and the downlink channel condition for each of the plurality of locations. The network analysis system 101 may determine the channel conditions based on information input by a user, information obtained from a model associated with the wireless telecommunications network, historical data associated with the wireless telecommunications network, and/or the like. The network analysis system 101 may store the channel conditions associated with the plurality of locations in a data structure (e.g., a channel conditions data structure, as shown in FIG. 1A).

In some implementations, the network analysis system 101 is associated with a plurality of channel conditions data structures. The plurality of channel conditions data structures may be associated with various different characteristics of the wireless telecommunications network (e.g., a frequency associated with the wireless telecommunications network, a geographical characteristic (e.g., mountainous, flat, and/or the like), and/or the like).

As an example, a first channel conditions data structure may be associated with a first frequency spectrum (e.g., 2.5 GHz) and a second channel conditions data structure may be associated with a second frequency spectrum (e.g., 5 GHz). The first channel conditions data structure may store information indicating channel conditions associated with data being transmitted between the UE and a base station from a location of the UE via the first frequency spectrum. The second channel conditions data structure may store information indicating channel conditions associated with data being transmitted between the UE and the base station from the location of the UE via the second frequency spectrum.

Figure 1B:
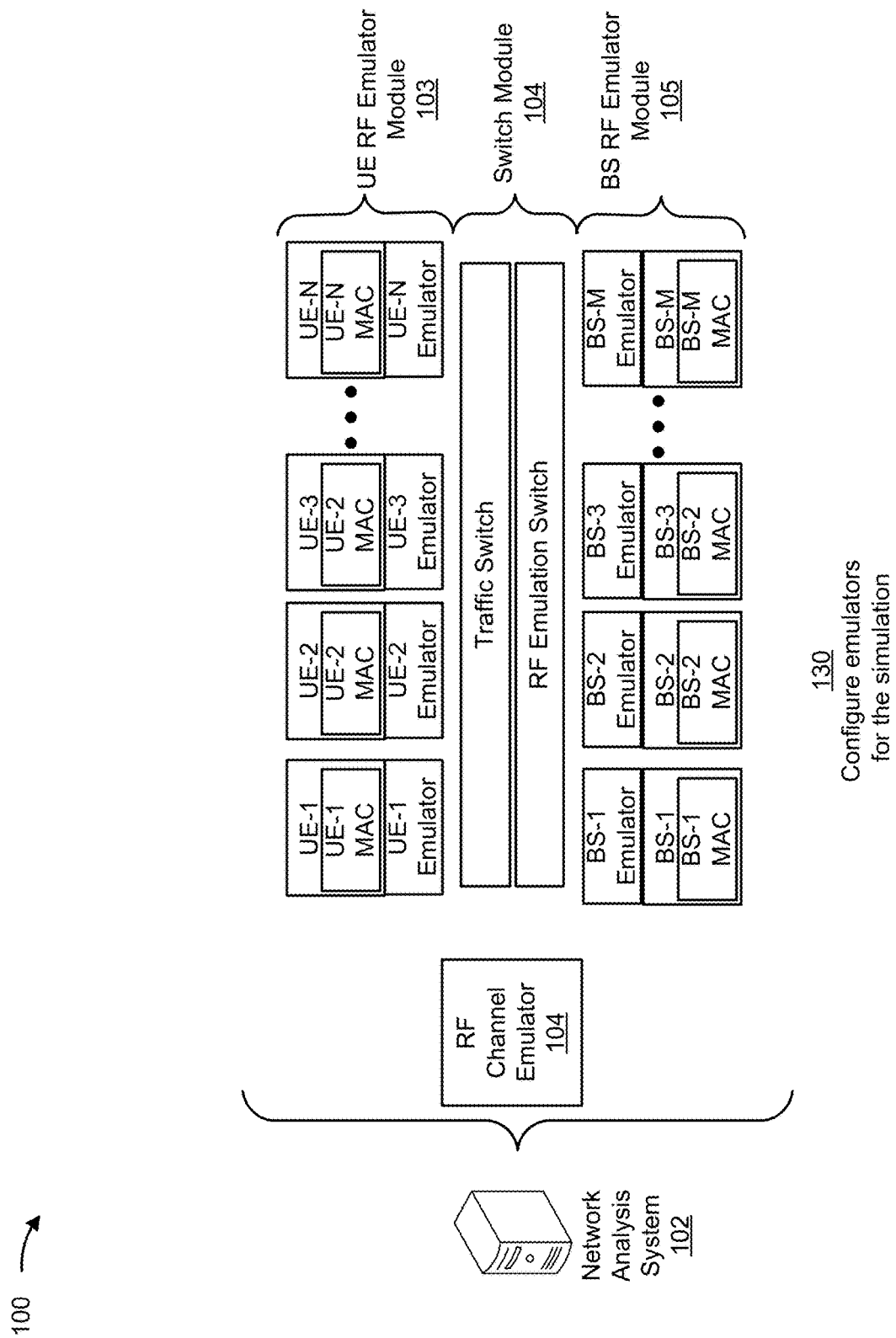

As shown in FIG. 1B, and by reference number 130, the network analysis system 101 configures emulators for the simulation. The emulators may be included in a physical layer abstraction (PLA) to simulate the effect of performing physical layer processes associated with uplink transmissions (e.g., coding, rate matching, scrambling, modulation, layer mapping, pre-coding transmission power, resource element mapping, beam forming port expansion, inverse fast Fourier transform (iFFT), cyclic prefix insertion, and/or the like) and/or physical layer processes associated with downlink transmissions (e.g., cyclic prefix removal, fast Fourier transform (FFT), port reduction, resource element mapping, channel estimation, diversity combiner, equalization, inverse discrete Fourier transform (iDFT), demodulation, descrambling, rate matching, decoding, and/or the like).

The PLA may include an RF channel emulator 102, a UE RF emulator module 103, a base station RF emulator module 105, and/or a switch module 104. The PLA may send transport channel data directly from the MAC.

The RF channel emulator 102 may include a graphical user interface (GUI) and path planning module and a channel conditions lookup module. The RF channel emulator 102 may be configured to obtain channel condition information associated with transmitting data between a UE and a base station based on a location of the UE and/or a location of the base station. The network analysis system 101 may configure the RF channel emulator 102 to insert information indicating an effect of the physical layer impairment (e.g., channel condition information) into MAC transport data transmitted between a base station module and a UE module. For example, the network analysis system 101 may configure the RF channel emulator 102 to insert information indicating an uplink channel condition and/or information indicating a downlink channel condition into MAC transport data transmitted between the UE module and the base station module.

The RF channel emulator 102 may receive data transmitted between the base station emulator and the UE emulator. The RF channel emulator 102 may apply a time stamp to the data. The time stamp may be provided by a centralized service to the GUI and path planning module also.

The GUI and path planning module may utilize the time stamp to determine location information associated with the UE emulator based on the simulation information. The simulation information may include information associating time stamps with locations of a UE associated with the UE emulator. The GUI and path planning module determine the location of the UE based on a pre-defined path. The location of the UE is shared with the RF Channel emulator 102. The RF Channel emulator 102 then extracts the RF channel conditions for that particular UE based on the relative location of the UE to the various surrounding base stations. The RF channel emulator 102 may be configured to apply the channel conditions.

In some implementations, the RF channel emulator 102 may modify the one or more portions of the data by inserting Gaussian noise into the data. The RF channel emulator 102 may determine an amount of Gaussian noise to be inserted into the data based on actual channel conditions associated with the location of the UE. For example, the channel condition information may include information identifying a signal-to-noise ratio associated with the location of the UE. The RF channel emulator 102 may determine the amount of Gaussian noise to be inserted into the data based on the signal-to-noise ratio. The RF channel emulator 102 may insert the channel condition information into the data and may utilize the switch module 104 to provide the data to the UE module and/or the base station module.

The UE RF emulator module 103 (shown in FIG. 1B, also referred to as the UE side channel emulator) may include a quantity of UE modules corresponding to one or more UEs operating within the wireless telecommunications network. The network analysis system 101 may determine the quantity of UEs operating within the wireless telecommunications network based on the simulation information. The network analysis system 101 may configure the UE RF emulator module 103 to control channel condition application for a predetermined number of UE modules, where the traffic of each UE is independent of the other UEs. The quantity of UE modules may be configured to emulate a performance of a quantity of UEs operating within the wireless telecommunications network. Furthermore the UE side emulator may drop packets from downlink transmissions based on the channel conditions obtained from the RF channel emulator 102.

A UE module, of the quantity of UE modules, may include a UE emulator and a UE MAC component. The UE emulator may be configured to simulate the impact of the physical layer and the air interface of the UE, e.g. taking into account propagation delay, the RF conditions, fading conditions based on the location of the UE relative to RAN elements and the like. The network analysis system 101 may configure the UE emulator to transmit MAC transport data via an Ethernet network. The UE emulator may use channel condition information associated with a location of the UE module to cause the MAC transport data to simulate an RF signal transmitted by the UE within the wireless telecommunications network.

The UE MAC component may be configured to simulate the MAC layer of the UE. The UE MAC component may determine RF characteristics associated with the MAC transport data based on the channel condition information. The UE MAC component may extract the channel condition information from data transmitted to the UE module by the base station module. The UE MAC component may schedule data to be transmitted to the base station module based on the channel conditions.

The UE MAC component may include a hybrid automatic repeat request (HARQ) element, a multiplexing and de-multiplexing element, a logical channel prioritization element, a control element, and/or the like.

The HARQ element may simulate a transmit HARQ operation and/or a receive HARQ operation. The transmit HARQ operation may include transmission of transport blocks, reception and processing of HARQ acknowledgement signaling, and/or the like. The receive HARQ operation may include the reception of transport blocks, combining and decoding the received transport blocks, generation of HARQ acknowledgement signaling, and/or the like.

The multiplexing and de-multiplexing element may simulate processes associated with composing and decomposing MAC packet data units (PDUs), multiplexing data from multiple logical channels into a transport channel, de-multiplexing data from the transport channel into the multiple logical channels, and/or the like.

The logical channel prioritization element may simulate processes for instructing the multiplexing and de-multiplexing element to generate MAC PDUs when radio resources for a new transmission are allocated, determining an amount of data from each logical channel that is to be included in each MAC PDU when radio resources for a new transmission are available, and/or the like.

The control element may simulate processes associated with discontinuous reception (DRX) procedures, requesting resources, alignment of an uplink timing, power headroom reporting, and/or the like.

In some implementations, the UE module includes a virtual machine instantiated on a physical device. The virtual machine may share the same physical resources (e.g., an Ethernet interface, a central processing unit (CPU), a memory, and/or the like) with other virtual machines corresponding to other UE modules.

In some implementations, the UE RF emulator module 103 includes a plurality of UE modules instantiated on the same physical device. The network analysis system 101 may determine to instantiate the plurality of UE modules on the same physical device based on a quantity of computing resources required to instantiate the plurality of UE modules, a quantity of the plurality of UE modules failing to satisfy a threshold quantity, and/or the like.

In some implementations, the plurality of UE modules are instantiated on a plurality of physical devices. The network analysis system 101 may determine to instantiate the plurality of UE modules on the plurality of physical devices based on the quantity of computing resources required to instantiate the plurality of UE modules, the quantity of the plurality of UE modules satisfying the threshold quantity, and/or the like.

The base station RF emulator module 105 (as shown in FIG. 1B) may be configured to simulate a quantity of base station modules. The network analysis system 101 may determine a quantity of base stations operating within the wireless telecommunications network based on the simulation information. The network analysis system 101 may configure the base station RF emulator module 105 (alternatively referred to as a RAN side channel emulator) to include a corresponding quantity of base station modules. In some embodiments, the base station RF emulator module 105 may drop one or more packets received from the plurality of UEs based on channel conditions associated with the plurality of UEs. In this embodiment, the channel conditions are shared with the base station RF emulator module 105 by the RF channel emulator 102.

A base station module, of the quantity of base station modules, may be configured to emulate a performance of a base station operating within the wireless telecommunications network. The base station module may include a base station emulator and a base station MAC component.

The base station emulator may be configured to simulate a physical layer of a base station. The base station emulator may receive channel conditions associated with a UE inserted into uplink data transmitted by a UE module corresponding to the UE by the RF channel emulator 102. The base station emulator may determine a quality of the uplink data based on the channel conditions. The base station module may insert corresponding downlink reference messages into downlink data transmitted to the UE module. The base station module may modulate the downlink data based on the channel conditions.

The base station MAC component may be configured to determine an allocation of communication resources (e.g., resource blocks) to the UE module based on the channel conditions.

The network analysis system 101 may determine one or more characteristics of the base station emulator based on the simulation information. For example, the network analysis system 101 may determine a transmission frequency associated with the base station emulator, a quantity of antennas associated with the base station emulator, and/or the like based on the base station information included in the simulation information. The network analysis system 101 may configure the base station emulator based on the one or more characteristics.

In some implementations, the base station emulator includes a virtual machine instantiated on a physical device. The base station emulator may be configured to receive data transmitted by a UE emulator via a physical layer abstraction implemented on a physical layer of the physical device. The base station emulator may be configured to simulate the channel conditions associated with the received data based on the channel condition information inserted by the RF channel emulator 102.

In some implementations, the base station RF emulator module 105 includes a plurality of base station modules instantiated on the same physical device. The network analysis system 101 may determine to instantiate the plurality of base station modules on the same physical device based on a quantity of computing resources required to instantiate the plurality of base station modules, a quantity of the plurality of base station modules failing to satisfy a threshold quantity, and/or the like.

In some implementations, the plurality of base station modules are instantiated on a plurality of physical devices. The network analysis system 101 may determine to instantiate the plurality of base station modules on the plurality of physical devices based on the quantity of computing resources required to instantiate the plurality of base station modules, the quantity of the plurality of base station modules satisfying the threshold quantity, and/or the like.

The switch module 104 (shown in FIG. 1B) may include a traffic switch and an RF emulator switch. The switch module 104 may be a virtual switch that is configured to time stamp and/or schedule data to simulate data transmitted on a shared channel via the wireless telecommunications network. The switch module 104 may be configured to receive an integrated data stream from the base station module. The integrated data stream may include data for a plurality of UE modules. The switch module 104 may be configured to generate independent data streams for each simulated or physical UE and provide the data to the particular UE via the independent data stream.

The switch module 104 may be configured to receive data from multiple UE modules. The switch module 104 may aggregate the received data and may transmit the aggregated data to the base station module.

In some implementations, the switch module 104 transmits data to the UE module and the base station module based on an IP address associated with the UE module. The network analysis system 101 may assign an IP address to each base station emulator and/or to each UE emulator. The switch module 104 may transmit data between the base station module and the UE emulator based on the assigned IP addresses.

The traffic switch may include a high speed Ethernet switch having a high speed interface (e.g., a 10 Gb/s or greater interface). The network analysis system 101 may configure the traffic switch to process data transmitted via a user plane. The RF emulator switch may include a low speed Ethernet switch having a low speed interface (e.g., a 1 Gb/s or lower interface). The network analysis system 101 may configure the RF emulator switch to process data transmitted via a control plane. Because an amount of data transmitted via the control plane may be small relative to an amount of data transmitted via the user plane, utilizing the low speed Ethernet switch may enable the network analysis system 101 to conserve computing resources and/or may reduce a cost associated with the network analysis system 101.

Figure 1C:
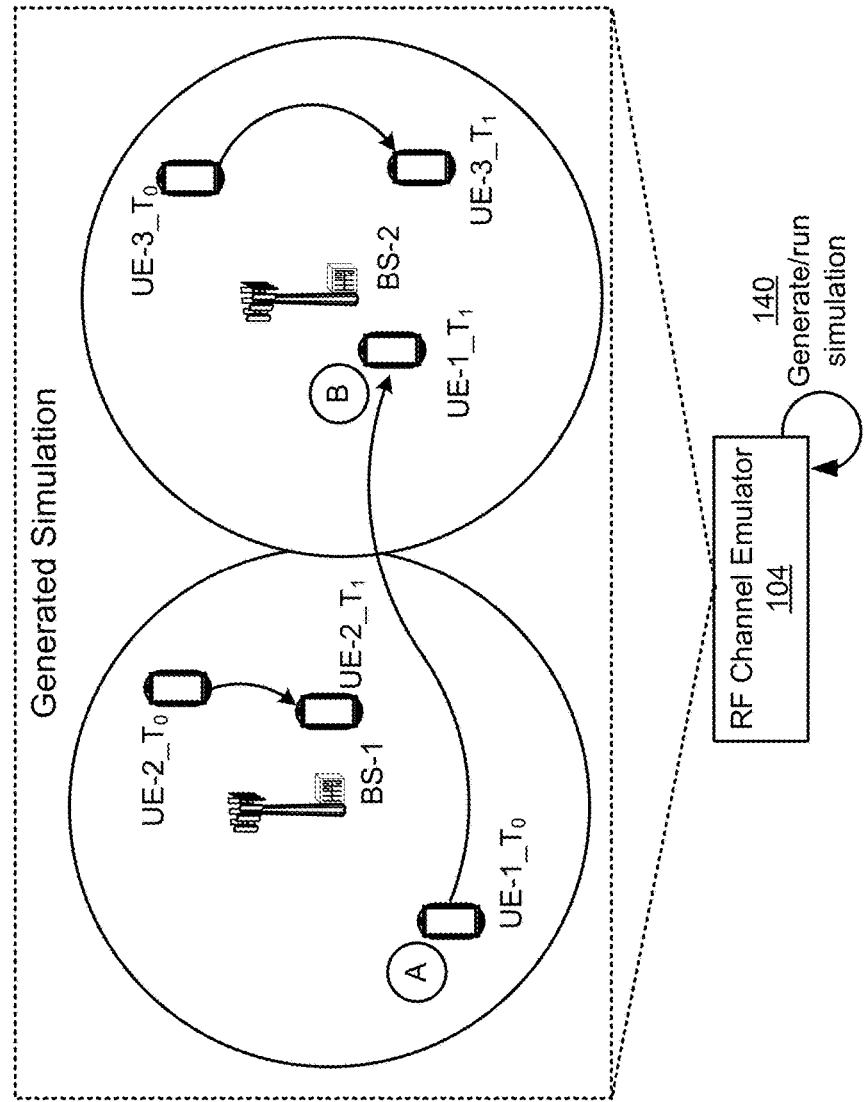

As shown in FIG. 1C, and by reference number 140, the network analysis system 101 generates and runs the simulation. The network analysis system 101 may use the RF channel emulator 102, the UE RF emulator module 103, the base station emulator module, and/or the switch module 104 to execute or run the simulation of a wireless communication session according to the channel conditions. The network analysis system 101 may generate and/or run the simulation as described in greater detail below with respect to FIGS. 2A-2B and FIG. 3.

Figure 1D:
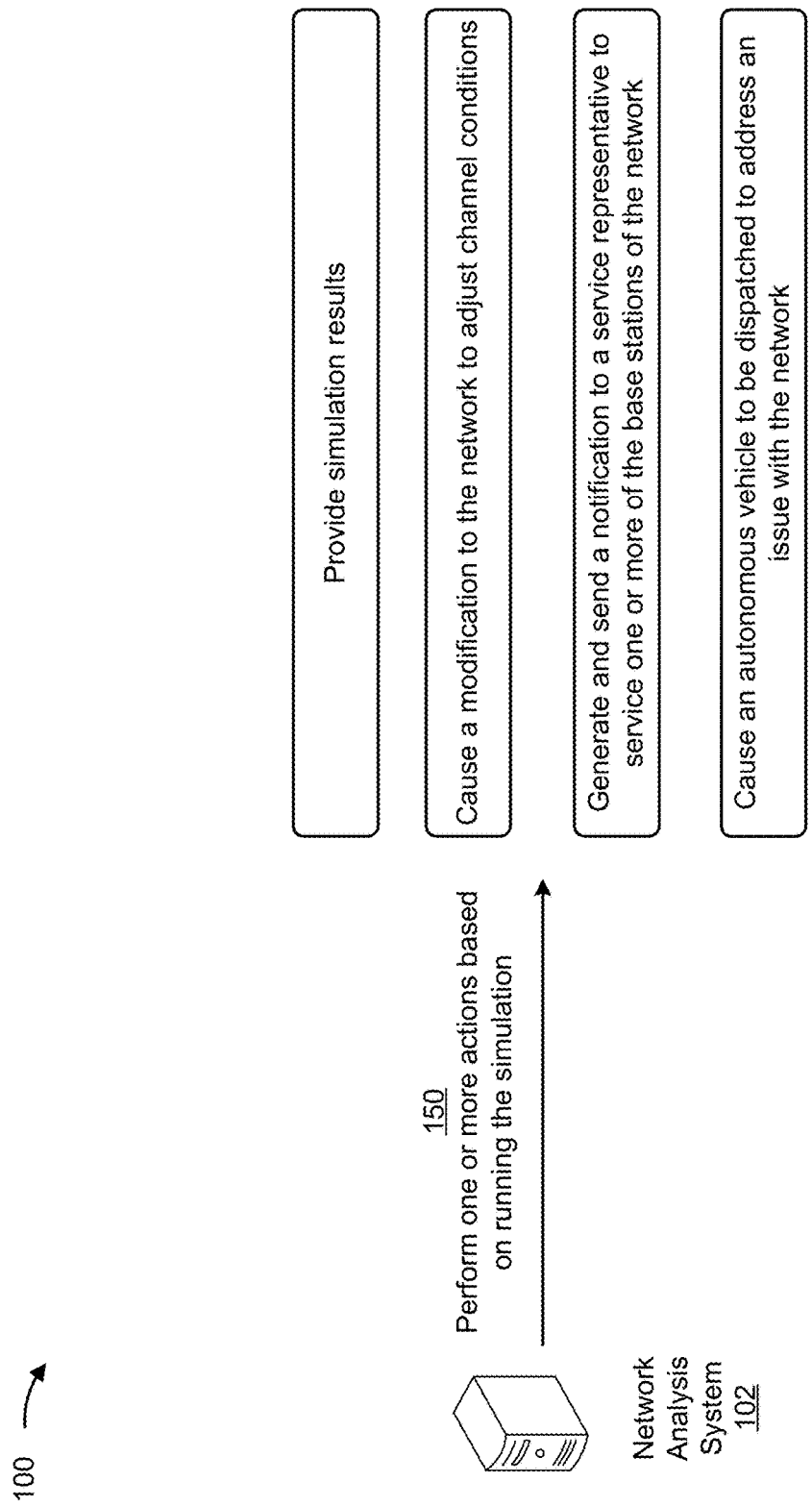

As shown in FIG. 1D, and by reference number 150, the network analysis system 101 performs one or more actions based on running the simulation. In some implementations, the one or more actions include providing simulation results. For example, the network analysis system 101 may perform a diagnostic analysis of the wireless telecommunications network based on running the simulation. The diagnostic analysis may determine how a planned modification to the wireless telecommunications network may affect a performance of the wireless telecommunications network. The network analysis system 101 may provide a result of the diagnostic analysis for display on a device associated with a network operator. In this way, the network analysis system 101 may enable a user (e.g., the network operator) to quickly and efficiently determine how a planned modification may affect the performance of the wireless telecommunications network.

In some implementations, the one or more actions include causing a modification to the wireless telecommunications network to adjust channel conditions. The network analysis system 101 may determine that a performance characteristic of a wireless communication session associated with a virtual base station and a virtual user equipment does not satisfy a threshold based on running the simulation. The network analysis system 101 may cause a modification to a base station corresponding to the virtual base station and/or to the wireless telecommunications network to improve channel conditions associated with the base station based on determining that the channel characteristic does not satisfy the threshold. In this way, the network analysis system 101 may automatically modify the wireless telecommunications network to improve the performance of the wireless telecommunications network. By automatically modifying the wireless telecommunications network, the network analysis system 101 may conserve computing resources, human resources, and/or the like that may have otherwise been utilized to cause a modification to the wireless telecommunications network to adjust channel conditions.

In some implementations, the one or more actions include generating and sending a notification to a service representative to service one or more of the base stations of the network and/or causing an autonomous vehicle to be dispatched to address an issue with the wireless telecommunications network. The network analysis system 101 may determine that a performance characteristic of a wireless communication session associated with a virtual base station and a virtual user equipment does not satisfy a threshold based on running the simulation. The network analysis system 101 may generate and/or send a notification to a service representative to service a base station corresponding to the virtual base station and/or cause an autonomous vehicle to be dispatched to address an issue with the base station based on the performance characteristic not satisfying the threshold.

As indicated above, FIGS. 1A-1D are provided as one or more examples. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2A:
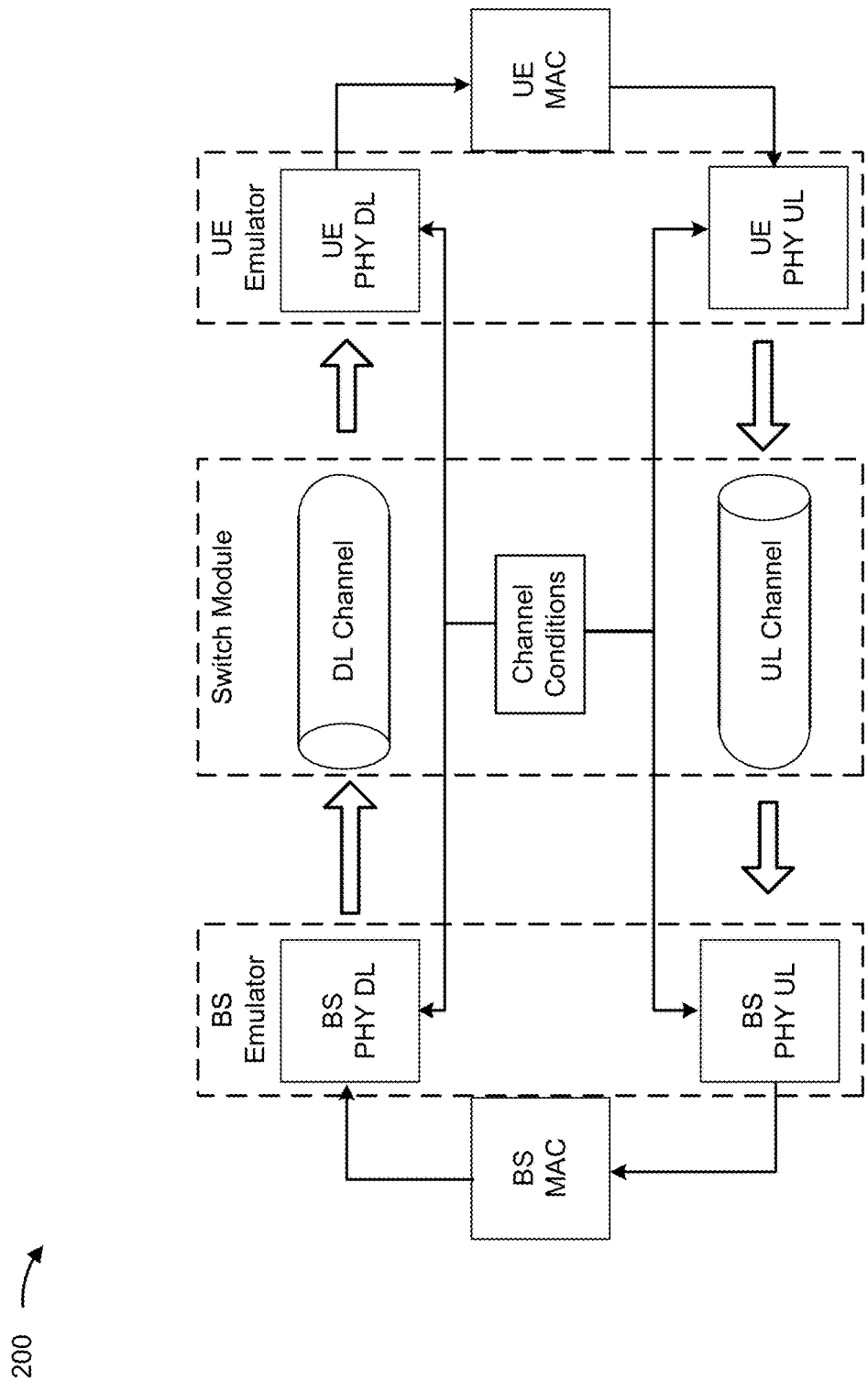
FIGS. 2A-2B are diagrams of one or more example implementations described herein.
Figure 2B:
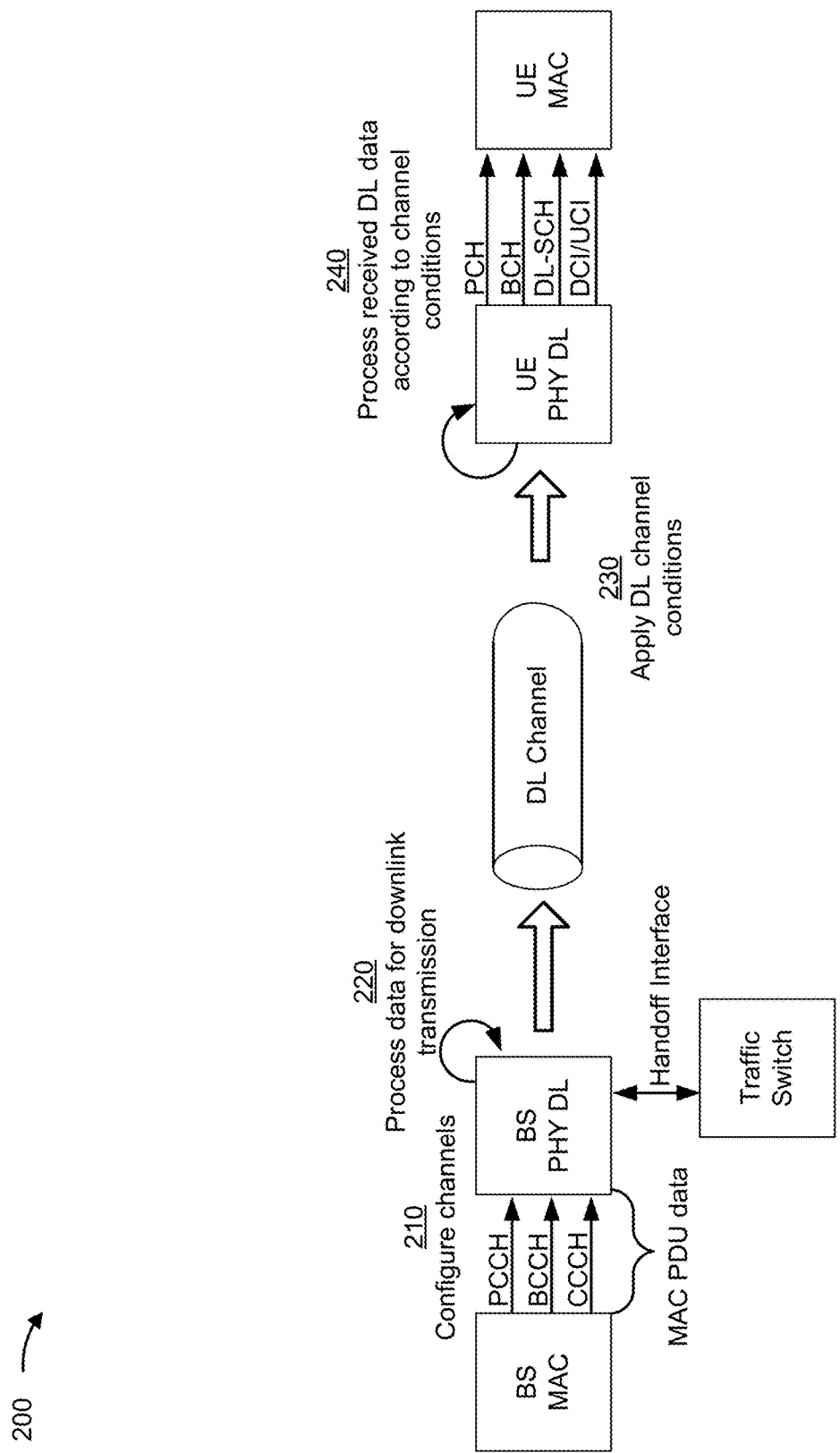

FIGS. 2A-2B are diagrams of one or more example implementations 200 described herein. As shown in FIGS. 2A-2B, the switch module 104 may enable data to be transmitted between the base station module and the UE module via an uplink channel and a downlink channel according to channel conditions determined by the RF channel emulator 102.

The base station emulator may be a component of a physical layer of the network analysis system 101. The base station emulator may simulate an antenna of a base station included in the wireless telecommunications network. The base station emulator may transmit downlink data (e.g., a reference signal) to the switch module 104 via a downlink channel.

The switch module 104 may be configured to handle communications of a wireless communication session. In some implementations, the switch module 104 forwards unicast messages generated based on a broadcast message received from a base station module. For example, the switch module 104 may receive a broadcast message from a base station module. The broadcast message may include information associated with a set of UE modules. The RF channel emulator 102 may analyze the broadcast message and may determine the set of UE modules associated with the broadcast message. The RF channel emulator 102 may convert the broadcast message into a plurality of unicast messages associated with the set of UE modules. The RF channel emulator 102 may provide the plurality of unicast messages to the switch module 104. The switch module 104 may forward the plurality of unicast messages to the set of UE modules. In this way, the RF channel emulator 102 and the switch module 104 may reduce an amount of data transmitted between the base station modules and the UE modules thereby conserving computing resources that otherwise would have been utilized to transmit the broadcast message to a UE module that is not associated with the broadcast message.

In some implementations, the switch module 104 provides consolidated data to a UE module and/or a base station module. For example, the switch module 104 may receive a broadcast message associated with a set of UE modules and a first unicast message associated with a UE module included in the set of UE modules. The RF channel emulator 102 may convert the broadcast message into a plurality of unicast messages associated with the set of UE modules. The RF channel emulator 102 may determine that a second unicast message, of the plurality of unicast messages, is associated with the UE module. The RF channel emulator 102 may generate consolidate the first unicast message and the second unicast message to generate consolidated data based on the first unicast message and the second unicast message being associated with the UE module. The RF channel emulator 102 may provide the consolidated data to the switch module 104 and the switch module 104 may transmit the consolidated data to the UE module. In this way, the RF channel emulator 102 and the switch module 104 may conserve computing resources that otherwise would have been utilized to transmit two separate unicast messages to the UE module.

The switch module 104 may include a first switch fabric that facilitates communication of the simulated traffic during the simulation. The first switch fabric may include a high speed switch component for simulated traffic between the UE and the base station. The high speed switch component may be included in the physical layer of the network analysis system 101. The high speed switch component may be an Ethernet switch component having, for example, a 10 (or faster) Gb/s interface.

The switch module 104 may include a second switch fabric that simulates the channel conditions during the simulation. The second switch fabric may include a low speed switch component for simulating the channel conditions during the simulation. The low speed switch component may be included in the physical layer of the network analysis system 101. The low speed switch component may be an Ethernet switch component having, for example, a 1 (or slower) Gb/s interface. The low speed switch component may be associated with RF simulation of the channel conditions.

Prior to the switch module 104 forwarding the downlink data to a UE module, the RF channel emulator 102 may obtain channel conditions associated with the downlink data based on a location of the UE module relative to the base station module, as described below with respect to FIG. 3. The RF channel emulator 102 may provide the channel conditions to the UE module and the base station module for application to uplink and/or downlink transmissions.

The switch module 104 may analyze the downlink data to determine an IP address associated with the UE module to which the downlink data is to be transmitted. For example, the switch module 104 may analyze the downlink data to determine an identifier associated with the UE module. The switch module 104 may access a data structure storing information associating identifiers with IP addresses to determine an IP address associated with the identifier. The switch module 104 may provide the downlink data to the UE module based on the IP address.

The UE emulator of the UE module may receive the downlink data and/or the information indicating the channel conditions. The UE emulator may extract the information identifying the channel conditions from the downlink channel and may apply the channel conditions to the downlink data. The UE emulator may provide the downlink data to the UE MAC component based on applying the channel conditions.

The UE MAC component may schedule uplink data to be transmitted to the base station module, may determine a modulation scheme (e.g., bipolar phase keying (BPSK), quadrature phase shift keying (QPSK), amplitude shift keying (ASK), frequency shift keying (FSK), and/or the like) associated with transmitting data to the base station module, and/or the like based on the channel conditions applied to the downlink data. The UE emulator may transmit uplink data to the base station module, via the switch module 104, based on the schedule, the modulation scheme, and/or the like determined by the UE MAC component.

The switch module 104 may receive the uplink data. Prior to the switch module 104 forwarding the uplink data to the base station module, the RF channel emulator 102 may determine channel conditions associated with the uplink data based on a location of the UE module relative to the base station module, as described below with respect to FIG. 3. The RF channel emulator 102 may apply the channel conditions to the uplink data and/or may provide information indicating the channel conditions to the UE module and the base station module.

The switch module 104 may analyze the uplink data to determine an IP address associated with the base station module to which the uplink data is to be transmitted. For example, the switch module 104 may analyze the uplink data to determine an identifier associated with the base station module. The switch module 104 may access a data structure storing information associating identifiers with IP addresses to determine an IP address associated with the identifier. The switch module 104 may provide the uplink data to the base station module based on the IP address.

The base station emulator may receive the uplink data via the uplink channel. The base station MAC component may extract channel condition information from the uplink data. The base station MAC component may determine channel conditions associated with the uplink channel based on the channel condition information. The base station MAC component may allocate resources to the UE module based on the channel conditions associated with the uplink channel. The base station MAC component may provide information identifying the allocated resources to the base station emulator. The base station emulator may transmit downlink data to the UE module. The downlink data may include information indicating the resources allocated to the UE module to enable the UE module to utilize the allocated resources to communicate via the wireless telecommunications network.

FIG. 2B is a diagram illustrating a transmission of downlink data via a downlink channel according to one or more implementations described herein. As shown in FIG. 2B, and by reference number 210, the network analysis system 101 configures channels for transmitting data between the base station module and the UE module. In some implementations, the base station module configures logical channels for transmitting data between the base station MAC component and the base station emulator. In some implementations, the base station MAC component configures a paging control channel (PCCH), a broadcast control channel (BCCH), and/or a common control channel (CCCH).

The PCCH may be a logical control channel that is utilized to transmit paging information when the base station module is searching for a UE module on the wireless telecommunications network. The base station module may transmit data via the PCCH to determine a base station module to which a particular UE module is connected.

The BCCH may be a logical channel that is utilized to provide system information to UE modules connected to the base station module. The base station module may utilize the BCCH to transmit parameters utilized by a UE module to identify and/or access the wireless telecommunications network. For example, the base station module may utilize the BCCH to transmit a location area code (LAC), a routing area code (RAC), a mobile network code (MNC), a BCCH allocation list, and/or the like.

The CCCH may be a channel that is utilized to transmit control information between the base station module and UE modules connected to the base station module. The CCCH may include a random access channel (RACH) that is utilized by the UE module to access the wireless telecommunications network, an access grant control channel (AGCH) that is utilized by the base station module to assign a dedicated control channel to a UE module in response to an access message received via the RACH, and/or the like.

In some implementations, the base station module configures physical channels for transmitting data between the base station module and the UE module. For example, the base station module may configure a physical broadcast channel (PBCH), a physical downlink control channel (PDCCH), a physical downlink shared channel (PDSCH), a physical uplink shared channel (PUSCH), a physical uplink control channel (PUCCH) a physical random access channel (PRACH), and/or the like.

The PBCH may be a downlink channel utilized to transmit system information associated with UE modules seeking access to the wireless telecommunications network. For example, the PBCH may be utilized to transmit master information block (MIB) messages.

The PDCCH may be a downlink channel utilized to transmit downlink control information. For example, the downlink control information may include information identifying downlink resources allocated to a UE module, uplink power control instructions, information identifying uplink resource grants, and/or the like.

The PDSCH may be a downlink channel utilized to transmit user data, dedicated control and user-specific higher layer information, and downlink system information. The PUSCH may be an uplink channel utilized to transmit user data, dedicated control and user-specific higher layer information, and uplink system information. The PUCCH may be an uplink channel utilized to transmit uplink control information. The PRACH may be an uplink channel utilized for RACH functions.

As shown by reference number 220, the base station emulator processes data for downlink transmission. The base station emulator may receive downlink data for a UE module from the base station MAC component. The base station emulator may generate a header for the downlink data. The header may include a time stamp corresponding to a reference signal utilized to synchronize the simulation, a source identifier (e.g., an identifier associated with the base station module), a destination identifier (e.g., an identifier associated with the UE module), and/or the like. The base station emulator may transmit the data to the switch module 104 via a physical channel.

As shown by reference number 230, the network analysis system 101 applies downlink channel conditions. The switch module 104 may receive the downlink data from the base station module. The RF channel emulator 102 may determine the UE module and the base station module associated with the downlink data based on the source identifier and the destination identifier. The RF channel emulator 102 may determine a time associated with the downlink data based on the time stamp. The RF channel emulator 102 may determine a location of the UE module at the time associated with the downlink data based on the simulation information.

The RF channel emulator 102 may determine channel conditions associated with the location of the UE module at the time associated with the downlink channel based on information stored in the channel conditions data structure. The RF channel emulator 102 may apply the channel conditions to the downlink data. The RF channel emulator 102 may provide the channel information to the UE module and the base station module. The switch module 104 may transmit the downlink data to the UE module based on the RF channel emulator 102 applying the channel conditions.

The UE emulator of the UE module may receive the downlink data from the switch module 104. As shown by reference number 240, the UE module processes received downlink data according to the channel conditions. The UE MAC component may determine uplink channel conditions based on the information identifying the channel conditions. The UE MAC component may schedule data to be transmitted via the uplink channel based on the uplink channel conditions.

The UE emulator may transmit uplink data to the switch module 104 via the uplink channel. The switch module 104 may receive the uplink data and the uplink data may be processed in a manner similar to that described above with respect to the downlink data. The switch module 104 may transmit the uplink data to the base station module based on the RF channel emulator 102 processing the uplink data. The base station emulator of the base station module may receive the uplink data and may process the uplink data based on the uplink channel conditions.

As indicated above, FIGS. 2A-2B are provided as one or more examples. Other examples may differ from what is described with regard to FIGS. 2A-2B. The number and arrangement of devices shown in FIGS. 2A-2B are provided as an example. In practice, there may be additional devices, fewer devices, different devices, or differently arranged devices than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) shown in FIGS. 2A-2B may perform one or more functions described as being performed by another set of devices shown in FIGS. 2A-2B.

Figure 3:
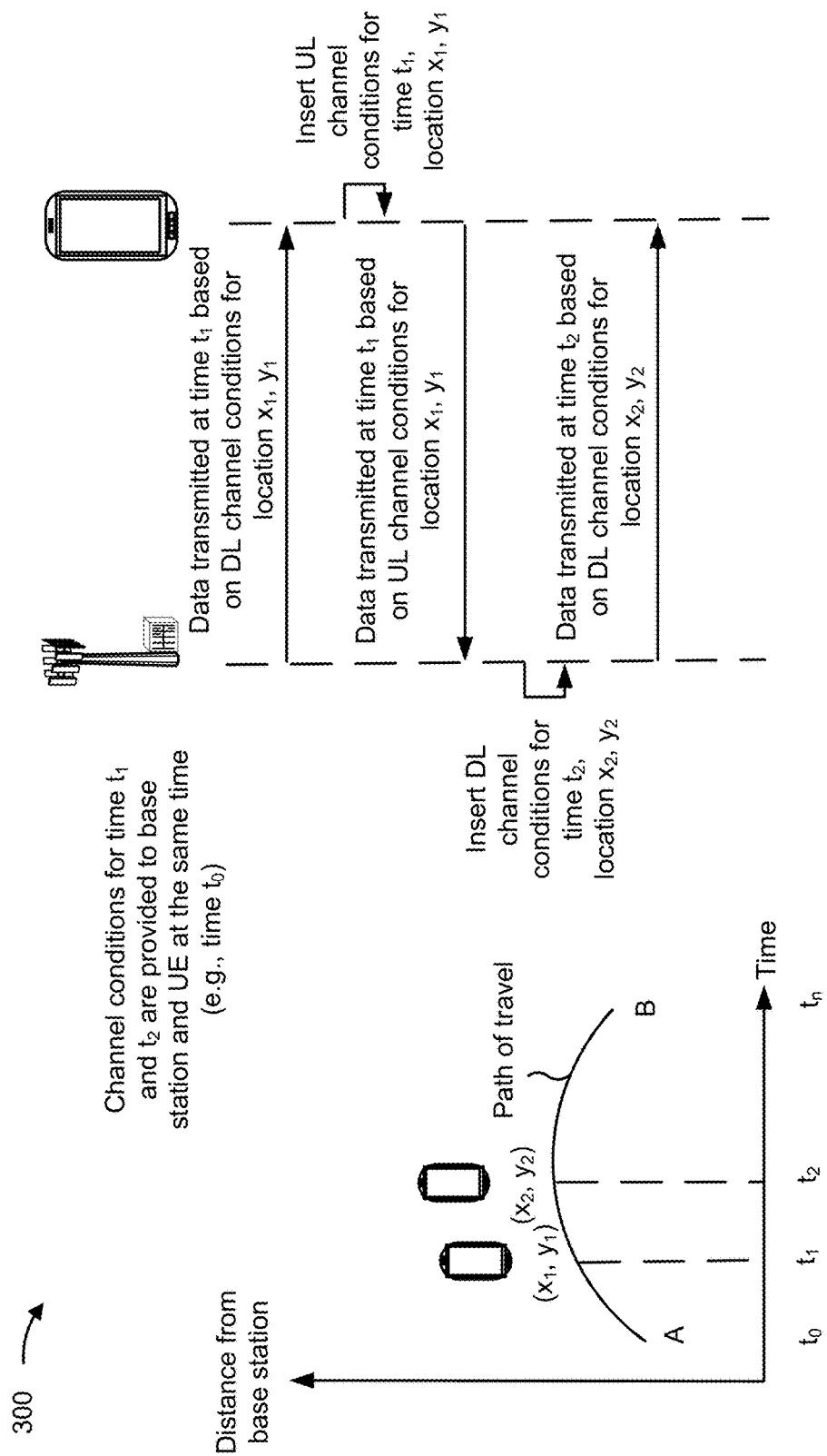
FIG. 3 is a diagram of an example implementation described herein.

FIG. 3 is a diagram of an example implementation 300 described herein. For example implementation 300, assume the simulation information includes information indicating a path of travel associated with a UE module corresponding to a UE in the wireless telecommunications network. The simulation information may indicate locations for the UE module at different times during the simulation.

In some implementations, the network analysis system 101 determines the channel conditions associated with the UE module based on simulated distances between the UE module and the base station module during the simulation. The network analysis system 101 may determine a path of travel of the UE module relative to a location of the base station module during the wireless communication session based on the simulation information. The network analysis system 101 may determine the simulated distances based on the location of the base station module and the path of travel of the UE module.

The network analysis system 101 may determine RF characteristics (e.g., channel conditions) associated with the UE module at the simulated distances. The network analysis system 101 may determine the RF characteristics based on information stored in a data structure (e.g., the channel conditions data structure). The data structure may include information indicating RF characteristics associated with a UE transmitting data at various distances away from a base station. The network analysis system 101 may determine the channel conditions (e.g., the RF characteristics) associated with the UE module transmitting data at the simulated distances based on the information stored in the data structure.

As shown in FIG. 3, the simulation information indicates that the UE is located at a first location $(X_1, Y_1)$ at a time $t_1$ and that the UE is located at a second location $(X_2, Y_2)$ at a time $t_2$. The network analysis system 101 may determine channel conditions (e.g., downlink channel conditions, uplink channel conditions, and/or the like) associated with transmitting data between a base station module and the UE module at the first and second locations based on information stored in a channel conditions data structure, as described above. The network analysis system 101 may provide information identifying the channel conditions to the base station module and the UE module.

The base station module may receive the information identifying the channel conditions. The base station module may determine downlink channel conditions associated with transmitting downlink data to the UE module via a downlink channel based on the information identifying the channel conditions. The base station module may transmit the downlink data to the UE module based on the downlink channel conditions for the first location.

The UE module may receive the downlink data. The UE module may generate uplink data to be transmitted to the base station module. The UE module may determine uplink channel conditions associated with transmitting the uplink data to the base station module. The UE module may insert information indicating the uplink channel conditions into the uplink data. The UE module may transmit the uplink data to the base station module via the uplink channel based on the uplink channel conditions associated with the first location.

The base station module may receive the uplink data and may determine the uplink channel conditions based on the information identifying the uplink channel conditions inserted into the uplink data. At the time t2, the base station module may determine downlink channel conditions associated with transmitting downlink data to the UE module at the second location. The base station module may insert information identifying the downlink channel conditions into the downlink data. The base station module may transmit the downlink data to the UE module based on the downlink channel conditions associated with the second location.

In some implementations, the path of travel indicates that the first base station, during the wireless communication session, is to hand off the UE to another base station. The network analysis system 101 may determine the channel conditions based on a location of the other base station.

In some implementations, the simulation information includes a path of travel for another UE. The network analysis system 101 may determine the channel conditions for the UE based on the path of travel for the other UE.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
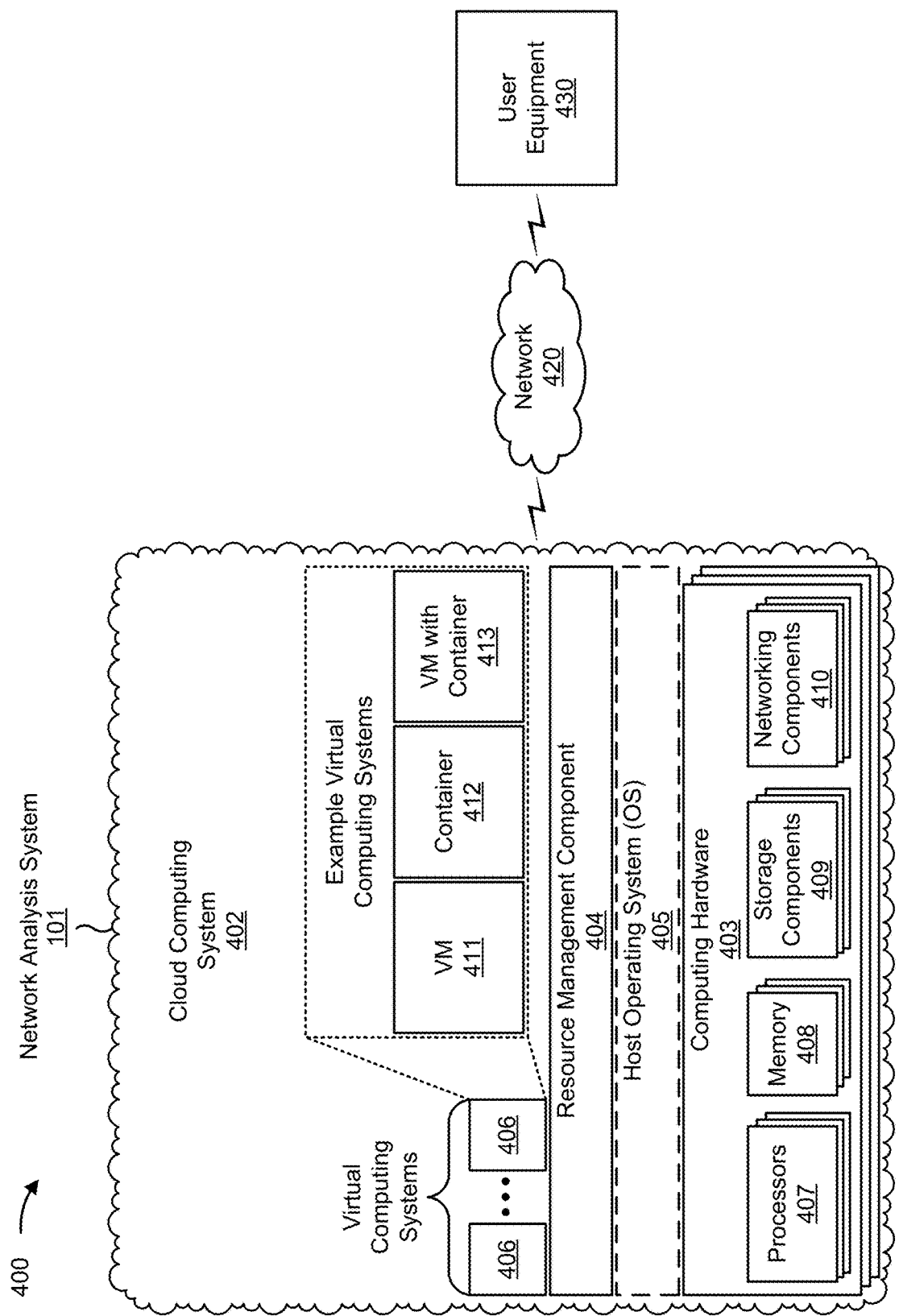
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a network analysis system 101, which may include one or more elements of and/or may execute within a cloud computing system 402. The cloud computing system 402 may include one or more elements 403-413, as described in more detail below. As further shown in FIG. 4, environment 400 may include a network 420 and/or user equipment 430. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server)

or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications using a file system that includes binary files, software libraries, and/or other resources required to execute applications on a guest operating system (e.g., within the virtual computing system 406) or the host operating system 405.

Although the network analysis system 101 may include one or more elements 403-413 of the cloud computing system 402, may execute within the cloud computing system 402, and/or may be hosted within the cloud computing system 402, in some implementations, the network analysis system 101 may not be cloud-based (e.g., may be implemented outside of a cloud computing system) or may be partially cloud-based. For example, the network analysis system 101 may include one or more devices that are not part of the cloud computing system 402, such as device 500 of FIG. 5, which may include a standalone server or another type of computing device. The network analysis system 101 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

User equipment 430 includes one or more devices capable of receiving, generating, storing, processing, and/or providing information associated with performing a diagnostic analysis of a wireless communication network, as described elsewhere herein. User equipment 430 may include a communication device and/or a computing device. For example, user equipment 430 may include a wireless communication device, a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User equipment 430 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
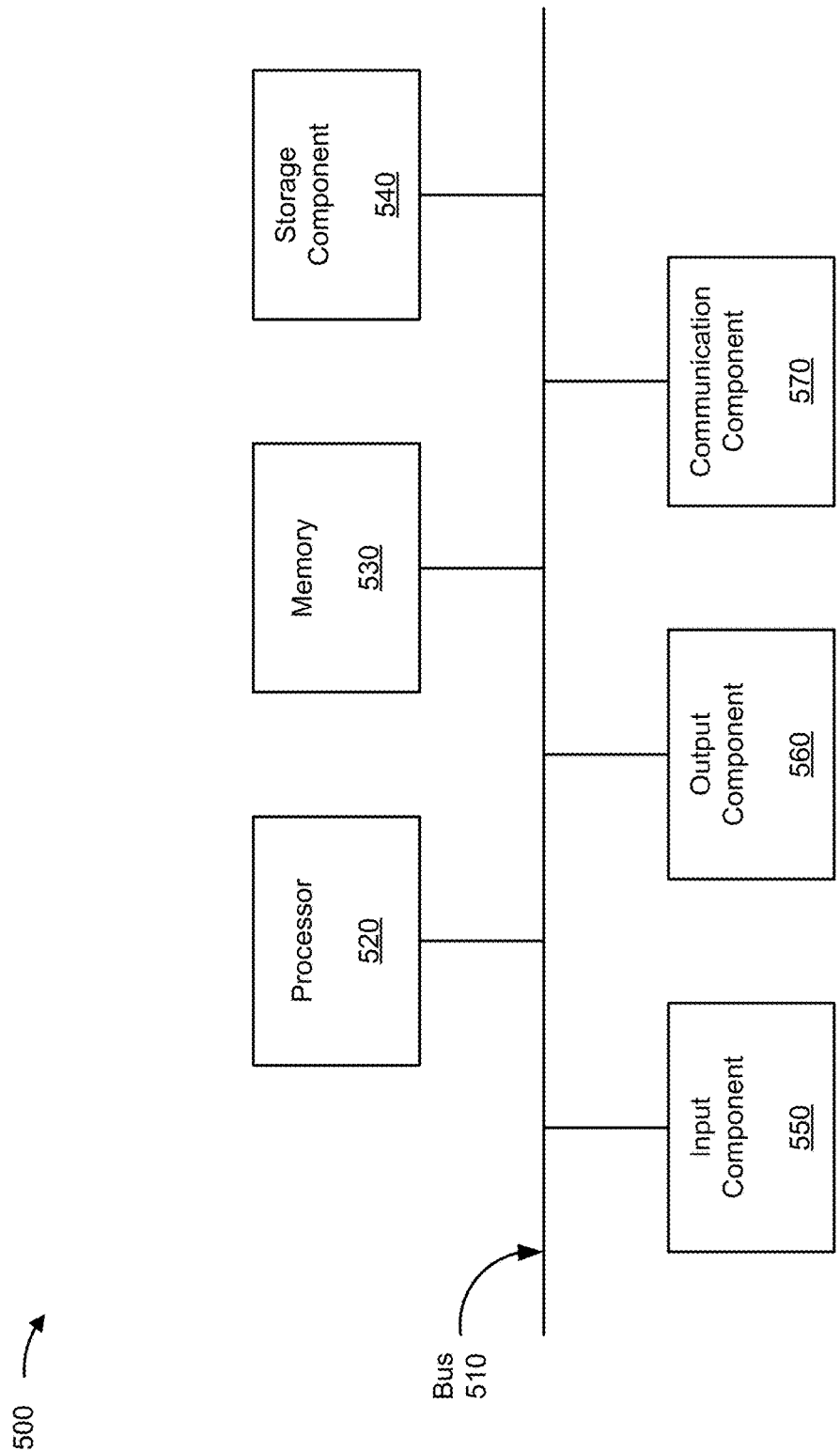
FIG. 5 is a diagram of example components of one or more devices of FIG. 4.

FIG. 5 is a diagram of example components of a device 500, which may correspond to network analysis system 101 and/or user equipment 430. In some implementations, network analysis system 101 and/or user equipment 430 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory), a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, an actuator, and/or the like. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, an antenna, and/or the like.

Device 500 may perform one or more processes described herein. For example, a non-transitory computer-readable medium (e.g., memory 530 and/or storage component 540) may store a set of instructions (e.g., one or more instructions, code, software code, program code, and/or the like) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
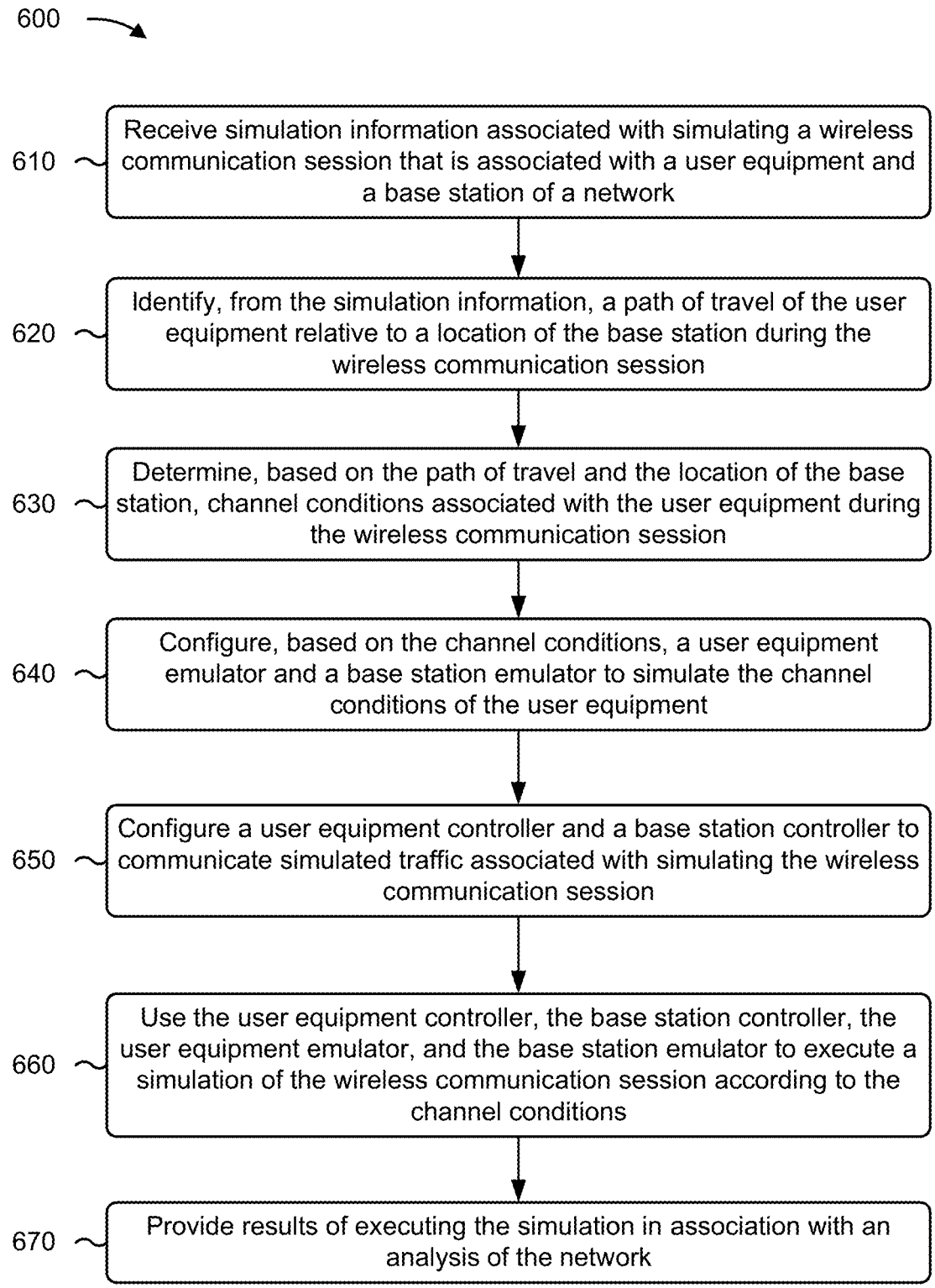
FIG. 6 is a flow chart of an example process relating to performing a diagnostic analysis of a wireless communication network.

FIG. 6 is a flow chart of an example process 600 associated with systems and methods for performing a diagnostic analysis of a wireless communication network. In some implementations, one or more process blocks of FIG. 6 may be performed by a device (e.g., network analysis system 101). In some implementations, one or more process blocks of FIG. 6 may be performed by another device or a group of devices separate from or including the device, such as a user equipment (e.g., user equipment 430) and/or the like. Additionally, or alternatively, one or more process blocks of FIG. 6 may be performed by one or more components of a device 500, such as processor 520, memory 530, storage component 540, input component 550, output component 560, communication component 570, and/or the like.

As shown in FIG. 6, process 600 may include receiving simulation information associated with simulating a wireless communication session that is associated with a user equipment and a base station of a network (block 610). For example, the device may receive simulation information associated with simulating a wireless communication session that is associated with a user equipment and a base station of a network, as described above.

As further shown in FIG. 6, process 600 may include identifying, from the simulation information, a path of travel of the user equipment relative to a location of the base station during the wireless communication session (block 620). For example, the device may identify, from the simulation information, a path of travel of the user equipment relative to a location of the base station during the wireless communication session, as described above.

As further shown in FIG. 6, process 600 may include determining, based on the path of travel and the location of the base station, channel conditions associated with the user equipment during the wireless communication session (block 630). For example, the device may determine, based on the path of travel and the location of the base station, channel conditions associated with the user equipment during the wireless communication session, as described above.

In some implementations, the simulation information includes information identifying a user equipment characteristic and information identifying a base station characteristic. The user equipment characteristic may correspond to a location of the user equipment and the base station characteristic may correspond to a location of the base station. The channel conditions may be determined based on the location of the user equipment and the location of the base station.

In some implementations, the user equipment characteristic corresponds to a path of travel of the user equipment over a duration of a simulation and the base station characteristic corresponds to a location of the base station. The channel conditions may be determined based on the path of travel of the user equipment and the location of the base station.

In some implementations, the device comprises a network mapping module that includes location information that identifies a location of the base station, a control module of the device, when determining the channel conditions, may be configured to determine, based on the location information and a simulation path of travel of the user equipment, simulated distances between the user equipment and the base station as the user equipment; identify, based on the location of the base station and the simulation path of travel, radio frequency characteristics associated with the user equipment at the simulated distances, and determine the channel conditions based on the simulated distances and the radio frequency characteristics.

In some implementations, the base station is a first base station and the path of travel indicates that the first base station, during the wireless communication session, is to hand off the user equipment to a second base station, the channel conditions are determined based on a location of the second base station. Alternatively, and/or additionally, the simulation information may include another path of travel for another user equipment and the channel conditions associated with the user equipment are determined based on the other path of travel of the other user equipment.

As further shown in FIG. 6, process 600 may include configuring, based on the channel conditions, a user equipment emulator and a base station emulator to simulate the channel conditions of the user equipment (block 640). For example, the device may configure, based on the channel conditions, a user equipment emulator and a base station emulator to simulate the channel conditions of the user equipment, as described above.

In some implementations, the user equipment emulator and the base station emulator are configured using the physical layer of the device. The user equipment emulator may comprise a first component of a physical layer of the device and the base station emulator may comprise a second component of the physical layer of the device.

In some implementations, a user equipment module (e.g., the user equipment emulator) comprises a UE side channel emulator that may apply downlink channel conditions, of the channel conditions, to downlink communications of the wireless communication session, and a base station module (e.g., the base station emulator) comprises base station side emulator (e.g., a RAN side emulator) is configured to apply uplink channel conditions, of the channel conditions, to uplink communications of the wireless communication session.

In some implementations, the user equipment emulator and the base station emulator may be communicatively coupled by a physical switch (e.g., an Ethernet switch) that is configured to handle communications of the wireless communication session. The switch module may comprise a high speed switch component associated with communicating the simulated traffic and a low speed switch component associated with radio frequency simulation of the channel conditions.

In some implementations, the switch comprises: a first switch fabric that facilitates communication of the simulated traffic during the simulation, and a second switch fabric that simulates the channel conditions during the simulation. In some implementations, the switch comprises: a high speed switch component, of the physical layer, for simulated traffic between the user equipment and the base station, and a low speed switch component, of the physical layer, for simulating the channel conditions.

As further shown in FIG. 6, process 600 may include configuring a user equipment controller and a base station controller to communicate simulated traffic associated with simulating the wireless communication session (block 650). For example, the device may configure a user equipment controller and a base station controller to communicate simulated traffic associated with simulating the wireless communication session, as described above. In some implementations, the user equipment controller is associated with the user equipment emulator and the base station controller is associated with the base station emulator. The user equipment controller and the base station controller may be associated with a media access control layer of the device. In some implementations, the user equipment controller and the base station controller are configured using a media access control (MAC) layer of the device.

As further shown in FIG. 6, process 600 may include using the user equipment controller, the base station controller, the user equipment emulator, and the base station emulator to execute a simulation of the wireless communication session according to the channel conditions (block 660). For example, the device may use the user equipment controller, the base station controller, the user equipment emulator, and the base station emulator to execute a simulation of the wireless communication session according to the channel conditions, as described above.

In some implementations, when executing the simulation, the device is configured to: cause a user equipment controller of a user equipment module to process the simulated traffic from a base station module, and cause a base station controller of the base station module to process the simulated traffic from the user equipment module. The user equipment controller and the base station module may be associated with a media access control layer of the system.

As further shown in FIG. 6, process 600 may include providing results of executing the simulation in association with an analysis of the network (block 670). For example, the device may provide results of executing the simulation in association with an analysis of the network, as described above.

In some implementations, process 600 includes performing an action. The action may include, based on results of the simulation: providing, to a display of a user device, the results of the simulation; causing a modification to the network to adjust the channel conditions; providing a notification to a service representative to service the base station; and/or causing an autonomous vehicle to be dispatched to address an issue with the network.

In some implementations, process 600 includes determining, based on executing the simulation, that a performance characteristic of the wireless communication session does not satisfy a threshold; and causing, based on determining that the performance characteristic does not satisfy the threshold, a modification to at least one of the base station or the network to improve the channel conditions.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for simulating a wireless communication network over a wired network, comprising:
    a plurality of user equipment (UEs) coupled to one another through the wired network;
    one or more radio area networks (RANs) simulated in software to simulate data transmission between the plurality of UEs;
    a channel condition emulator simulated in software to derive channel conditions for each of the plurality of UEs based on their current location, the channel condition emulator further providing the channel conditions to the plurality of UEs and the one or more RANs; and
    a switch that switches between one or more UE side channel emulators, wherein a UE side channel emulator, of the one or more UE side channel emulators, is a virtual emulator.

2. The system of claim 1, wherein the one or more UE side channel emulators are configured to:
    receiving the channel conditions for uplink and downlink transmissions and applying the channel conditions to an uplink data stream and a downlink data stream from each of the plurality of UEs, and
    dropping packets from a UE, of the plurality of UEs, based on the channel conditions for the downlink transmission,
        wherein the one or more UE side channel emulators replace a physical (PHY) layer and a radio interface for each of the plurality of UEs.

3. The system of claim 2, further comprising:
    one or more RAN side channel emulators that:
        receive the channel conditions from the channel condition emulator,
        modulate received data on uplink transmission to a radio cell based on the channel conditions for a particular UE and an associated location of the UE, and
        drop one or more packets received from the plurality of UEs based on the channel conditions associated with each of the plurality of UEs,
            wherein the one or more RAN side channel emulators each replace the physical and radio unit (RU) portions of an associated physical RAN.

4. The system of claim 3, where the one more RAN side channel emulators further:
    provide individual data streams to each of the plurality of UEs that is coupled to an associated radio cell.

5. The system of claim 3, wherein the channel condition emulator further:
    shares configuration information for each of the one or more RANs and addressing information for the plurality of UEs with the one or more UE side channel emulators and the radio cell, and
    shares addressing information of candidate RANs corresponding to the addressing information for the plurality of UEs.

6. The system of claim 1, wherein the one or more UE side emulators are virtual emulators sharing resources among each other.

7. The system of claim 1, further comprising a virtual switch configured to:
    apply a time stamp and schedules packets delivery in a shared channel of the virtual emulator;
    deliver the packets from the one or more RANs to each of the one or more UE side emulators; and
    aggregate packets from the one or more UE side emulators for transmission to the one or more RANs.

8. The system of claim 7, wherein the virtual switch comprises:
    a high speed switch component associated with communicating simulated traffic, and
    a low speed switch component associated with sharing the channel conditions between the channel condition emulator and one or more RAN side emulators.

9. A method comprising:
    obtaining, by a device, simulated location information for a plurality of user equipment (UEs);
    deriving, by the device, channel conditions for each of the plurality of UEs based on their simulated location;
    providing, by the device, the channel conditions to one or more UE side emulators interfacing with the plurality of UEs;
    providing, by the device, the channel conditions to one or more radio area network (RAN) side emulators interfacing with one or more RANs;
    monitoring a change in location of the plurality of UEs with respect to at least one of the one or more RANs; and
    updating, based on information associated with the change in location, the channel conditions.

10. The method of claim 9, wherein the channel conditions comprise conditions for both uplink transmission and downlink transmission, for the plurality of UEs, and the one or more RANs.

11. The method of claim 9, further comprising:
    sharing configuration information for each of the one or more RANs and addressing information for the plurality of UEs with the one or more UE side emulators and a radio cell.

12. The method of claim 9, wherein the information associated with the change in location comprises at least one of:
    information associated with an environment of the plurality of UEs that have changed location,
    information associated with a path taken of one or more UEs, of the plurality of UEs, that have changed location, or
    information associated with a speed of the one or more UEs that have changed location; and
    wherein the method further comprises notifying the plurality of UEs and the one or more RANs about the updated channel conditions.

13. The method of claim 12, wherein the location is associated with a distance between a known RAN and a UE, of the plurality of UEs, whose location has changed or a coordinate of the UE whose location has changed.

14. The method of claim 12, further comprising:
performing the notifying by publishing the updated channel conditions to a topic related to a corresponding UE of the plurality of UEs.

15. The method of claim 9, wherein the channel conditions further comprise impairments to data transmission.

16. A non-transitory computer-readable medium, storing instructions thereon that when executed by a processor cause the processor to:
obtain simulated location information for a plurality of user equipment (UEs);
derive channel conditions for each of the plurality of UEs based on their simulated location;
provide the channel conditions to one or more UE side emulators interfacing with the plurality of UEs;
provide the channel conditions to one or more radio access network (RAN) side emulators interfacing with one or more RANs;
monitor a change in location of the plurality of UEs with respect to the one or more RANs; and
update, based on information associated with the change in location, the channel conditions.

17. The medium of claim 16, wherein the channel conditions comprise conditions for both uplink transmission and downlink transmission, for the plurality of UEs, and the one or more RANs.

18. The medium of claim 16, wherein the instructions further cause the processor to:
share configuration information for each of the one or more RANs and addressing information for the plurality of UEs with the one or more UE side emulators and a radio cell.

19. The medium of claim 16, wherein the information associated with the change in location comprises at least one of:
information associated with an environment of the plurality of UEs that have changed location,
information associated with a path taken of one or more UEs, of the plurality of UEs, that have changed location, or
information associated with a speed of the one or more UEs that have changed location; and
wherein the instructions further cause the process to notify the plurality of UEs and the one or more RANs about the updated channel conditions.

* * * * *